US 8,006,588 B2

(12) United States Patent
Kowalski et al.

(10) Patent No.: US 8,006,588 B2
(45) Date of Patent: Aug. 30, 2011

(54) MULTI-LINK PARKING BRAKE ACTUATION SYSTEM

(75) Inventors: Gregory W. Kowalski, Grand Blanc, MI (US); Jeremy W. Short, Berkley, MI (US); Brian S. Paprocki, Macomb, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 97 days.

(21) Appl. No.: 12/349,546

(22) Filed: Jan. 7, 2009

(65) Prior Publication Data
US 2010/0170365 A1 Jul. 8, 2010

(51) Int. Cl.
*G05G 1/04* (2006.01)

(52) U.S. Cl. ........................................................ 74/523

(58) Field of Classification Search ................. 74/500.5, 74/501.6, 519, 523, 524, 525, 526
See application file for complete search history.

(56) References Cited

U.S. PATENT DOCUMENTS

| 2,464,096 A | * | 3/1949 | Orscheln | 74/518 |
| 4,292,858 A | * | 10/1981 | Lipshield | 74/501.6 |
| 4,353,265 A | * | 10/1982 | Lipshield | 74/502.4 |
| 5,065,643 A | * | 11/1991 | Axtell | 74/501.6 |
| 5,303,609 A | * | 4/1994 | Iwanaga et al. | 74/523 |
| 2007/0209469 A1 | * | 9/2007 | Otto | 74/523 |

FOREIGN PATENT DOCUMENTS
DE 40 27 654 A1 3/1992
* cited by examiner

*Primary Examiner* — Vicky A Johnson
(74) *Attorney, Agent, or Firm* — Ingrassia Fisher & Lorenz, P.C.

(57) ABSTRACT

Systems and apparatus are provided for a parking brake assembly for actuating a parking brake in a vehicle. The parking brake assembly comprises a mounting bracket fixedly attached to a mounting location of the vehicle, a first linkage element having a first end coupled to the mounting bracket at a first pivot, and a second linkage element having a first end pivotally attached to the mounting bracket. A brake cam is coupled to the first end of the first linkage element at the first pivot. A handle mechanism is pivotally attached to a second end of the first linkage element and to the second end of the second linkage element. The handle mechanism is configured such that movement of the handle mechanism actuates the brake cam.

20 Claims, 4 Drawing Sheets

MULTI-LINK PARKING BRAKE ACTUATION SYSTEM

TECHNICAL FIELD

Embodiments of the subject matter described herein relate generally to cable actuation systems, and more particularly, embodiments of the subject matter relate to a four-bar linkage actuation system for a parking brake in a vehicle.

BACKGROUND

Many vehicles include a manually-operated brake, also known as the parking brake or emergency brake. Many conventional automobiles utilize a hand-operated parking brake, which may be utilized to assist in keeping a vehicle motionless while parked or backup a hydraulic brake system. Typically, a hand-actuated lever is located within the passenger compartment of the vehicle, and positioned within reach of the driver and/or passenger. The lever is connected to the parking brake mechanism, and the driver and/or passenger pulls on the lever to engage the parking brake mechanism.

Most conventional parking brake levers rotate about single pivot point. In order to ensure that a user will be able to access and actuate the parking brake lever, the path that the handle of the lever travels through must be unobstructed by other vehicle components. As a result, the passenger compartment must be designed around the parking brake lever. For example, based on human factors, the parking brake lever is often positioned between the driver seat and the front passenger seat. The center console must be designed to accommodate the parking brake lever throughout its range of motion, and thus, the path of parking brake lever limits the design of a center console, for example, by limiting the design of and/or preventing the inclusion of cupholders, an armrest, a shifter, or other components or modules in the center console. Thus, conventional parking brake levers are inefficient from a packaging perspective and limit the ability to design a compact integrated center console equipped with all the features and functionality desired by consumers and users.

Additionally, to accommodate human factors, a conventional parking brake lever is designed to be actuated by pulling the parking brake lever from a substantially horizontal position to a more vertical position. As the lever position becomes more vertical, the tension in the system increases. Furthermore, a seated user loses leverage as the lever approaches a vertical position. As a result, it may be difficult for some users to fully engage the parking brake while remaining seated.

BRIEF SUMMARY

An apparatus is provided for a parking brake assembly for a vehicle. The parking brake assembly comprises a mounting bracket fixedly attached to a mounting location of the vehicle, a first linkage element having a first end coupled to the mounting bracket at a first pivot, and a second linkage element having a first end pivotally attached to the mounting bracket. A brake cam is coupled to the first end of the first linkage element at the first pivot. A handle mechanism is pivotally attached to a second end of the first linkage element and to the second end of the second linkage element. The handle mechanism is configured such that movement of the handle mechanism actuates the brake cam.

In another embodiment, an apparatus is provided for a multi-link brake actuation system. The multi-link brake actuation system comprises a first link having a substantially fixed position relative to a reference location. A second link has a first end being pivotally attached to the first link and a second end pivotally attached to a third link. A fourth link has a first end pivotally attached to the third link and a second end pivotally attached to the first link. A parking brake cable is coupled to the second end of the fourth link such that movement of the third link actuates the parking brake cable.

In yet another embodiment, a multi-link actuation system for a parking brake in a vehicle is provided. The multi-link actuation system comprises a brake cam and a four-bar linkage system. The four-bar linkage system comprises a first link having a first end attached to the brake cam. The four-bar linkage system further comprises a second link coupled to a second end of the first link. A handle is coupled to the second link. The handle is initially aligned parallel to a reference plane. The four-bar linkage system and the handle are cooperatively configured to actuate the parking brake cam in response to movement of the handle, wherein the handle remains substantially parallel to the reference plane in response to movement of the handle.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

DETAILED DESCRIPTION

The following detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, brief summary or the following detailed description.

The following description refers to elements or nodes or features being "connected" or "coupled" together. As used herein, unless expressly stated otherwise, "connected" means that one element/node/feature is directly joined to (or directly communicates with) another element/node/feature, and not necessarily mechanically. Likewise, unless expressly stated otherwise, "coupled" means that one element/node/feature is directly or indirectly joined to (or directly or indirectly communicates with) another element/node/feature, and not necessarily mechanically. Thus, although the schematics shown in FIGS. 1-5 depict exemplary arrangements of elements, additional intervening elements, devices, features, or components may be present in an embodiment of the depicted subject matter.

In addition, certain terminology may also be used in the following description for the purpose of reference only, and thus are not intended to be limiting. For example, terms such as "upper", "lower", "above", and "below" refer to directions in the drawings to which reference is made. Terms such as "front", "back", "rear", and "side" describe the orientation and/or location of portions of the component within a consistent but arbitrary frame of reference which is made clear by reference to the text and the associated drawings describing the component under discussion. In this regard, FIGS. 1-5 depict a three dimensional Cartesian coordinate system for explanatory purposes and ease of description only, and are not intended to be limit the scope of the subject matter in anyway. In addition, terms such as "first", "second" and other such numerical terms referring to structures do not imply a sequence or order unless clearly indicated by the context.

Technologies and concepts discussed herein relate to cable actuation systems. Although the subject matter may be described herein in the context of an actuation system for a vehicle parking brake cable, the subject matter is not intended to be limited to use with any particular cable or application. As described in greater detail below, an exemplary parking brake assembly comprises a mounting bracket coupled to a primary linkage at a first pivot. A brake cam coupled to a parking brake cable is coupled to the primary linkage at the first pivot. A handle mechanism is coupled to the primary linkage and configured to actuate the parking brake cable by rotating the primary linkage about the first pivot. The parking brake assembly is configured to minimize the impact of the travel path of the handle mechanism on the design of the interior passenger compartment, while also accommodating human design factor concerns.

FIGS. 1-5 depict an exemplary embodiment of a multi-link actuation system suitable for use as a parking brake assembly 100 in a vehicle, such as an automobile. In an exemplary embodiment, the parking brake assembly 100 includes, without limitation, a mounting bracket 102, a drive linkage 104, a primary linkage 106, a secondary linkage 108, a handle mechanism 110, and a brake cam 112. In an exemplary embodiment, the handle mechanism 110 includes a handle tube 114, and a handle 116. In an exemplary embodiment, the brake cam 112 is coupled to a parking brake cable 118 configured to engage the parking brake or emergency brake in the vehicle in response to movement of the handle mechanism 110 (or force applied to the handle 116), as described in greater detail below.

In an exemplary embodiment, the parking brake assembly 100 is realized as a four-bar linkage system comprising the mounting bracket 102 as a first link, the drive linkage 104 as a second link, the secondary linkage 108 as a third link, and the primary linkage 106 as a fourth link. As described in greater detail below, the four-bar linkage system is configured to actuate the brake cam 112 in response to movement of the handle mechanism 110 and/or handle 116. The parking brake assembly 100 is configured such that the handle 116 remains substantially parallel to a reference plane in response to movement of the handle 116, as described in greater detail below.

Figure 2:
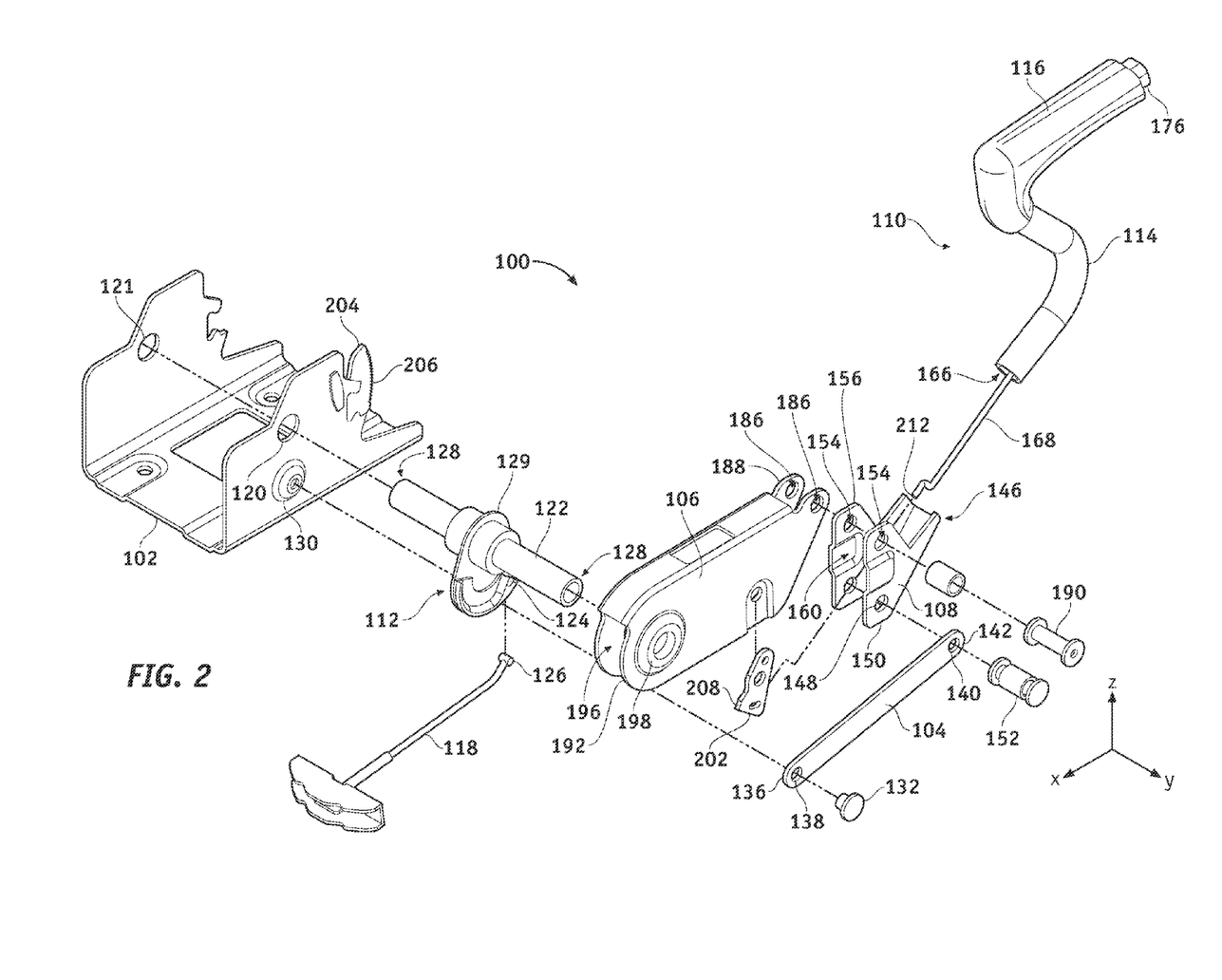
FIG. 2 is an exploded perspective view of the parking brake assembly of FIG. 1.
Figure 4:
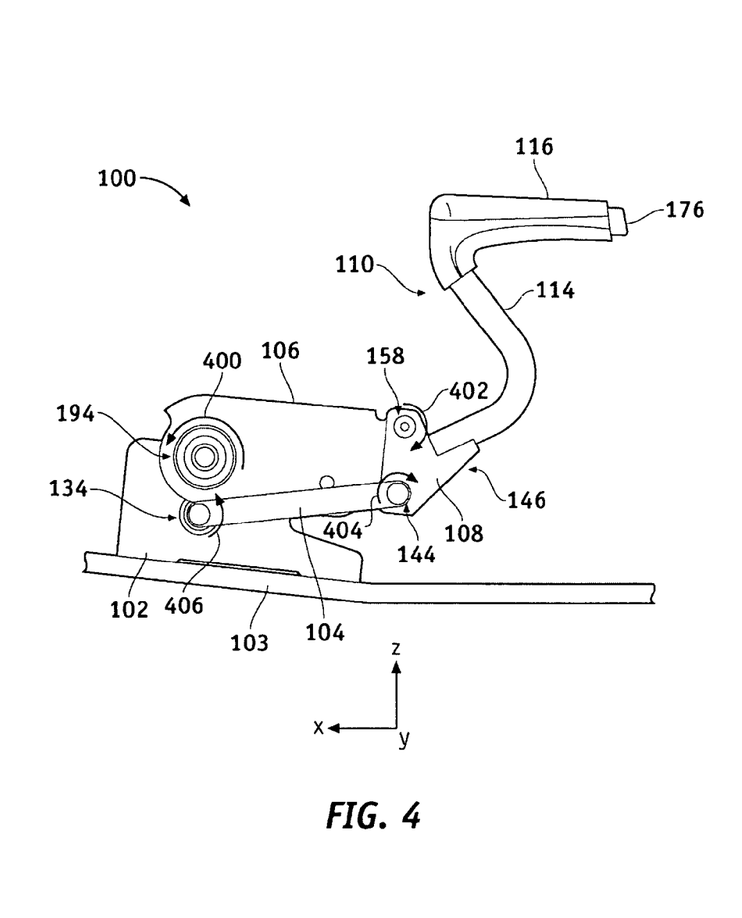
FIG. 4 is a side view of the parking brake assembly of FIG. 1 in an initial position.
Figure 5:
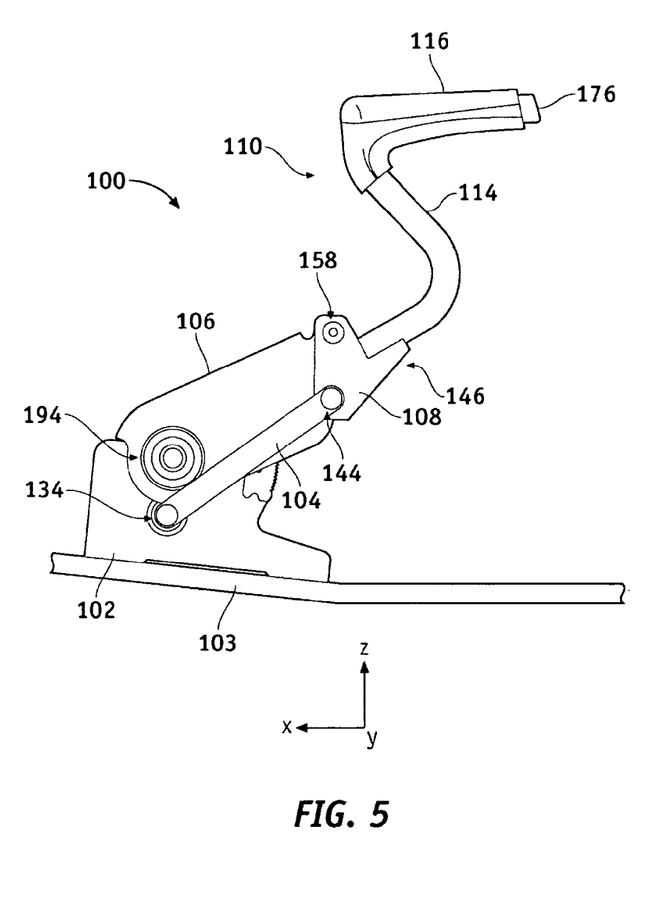
FIG. 5 is a side view of the parking brake assembly of FIG. 1 in a fully-actuated position.

As best shown in FIG. 2, the mounting bracket 102 comprises a substantially U-shaped (when viewed from the perspective of the front or rear of the vehicle) member formed of a rigid material, such as, for example, steel or aluminum. The particular shape and dimensions of the mounting bracket 102 may vary based on packaging constraints, as will be appreciated in the art. In an exemplary embodiment, the mounting bracket 102 has a substantially fixed position relative a reference location. Preferably, the mounting bracket 102 is fixedly attached to a mounting location such that the parking brake assembly 100 and/or handle 116 is accessible from within the passenger compartment of the vehicle. For example, as shown in FIG. 4 and FIG. 5, the mounting bracket 102 may be fixedly attached to the vehicle chassis 103. In this manner, the mounting bracket 102 functions as a fixed link (or ground link) for the four-bar linkage system, as will be appreciated in the art. The mounting bracket 102 includes one or more holes 120, 121 formed in the opposing and upstanding sides of the mounting bracket 102, and the holes 120, 121 are adapted to receive, support and/or hold the brake cam 112 as described in greater detail below. As shown, the holes 120, 121 are symmetrical and collinear, that is, the centers of the holes 120, 121 are aligned along the y-axis. Depending on the embodiment, the holes 120, 121 may be disposed near the longitudinal midsection of the mounting bracket 102 or biased towards the front of the mounting bracket 102.

Figure 1:
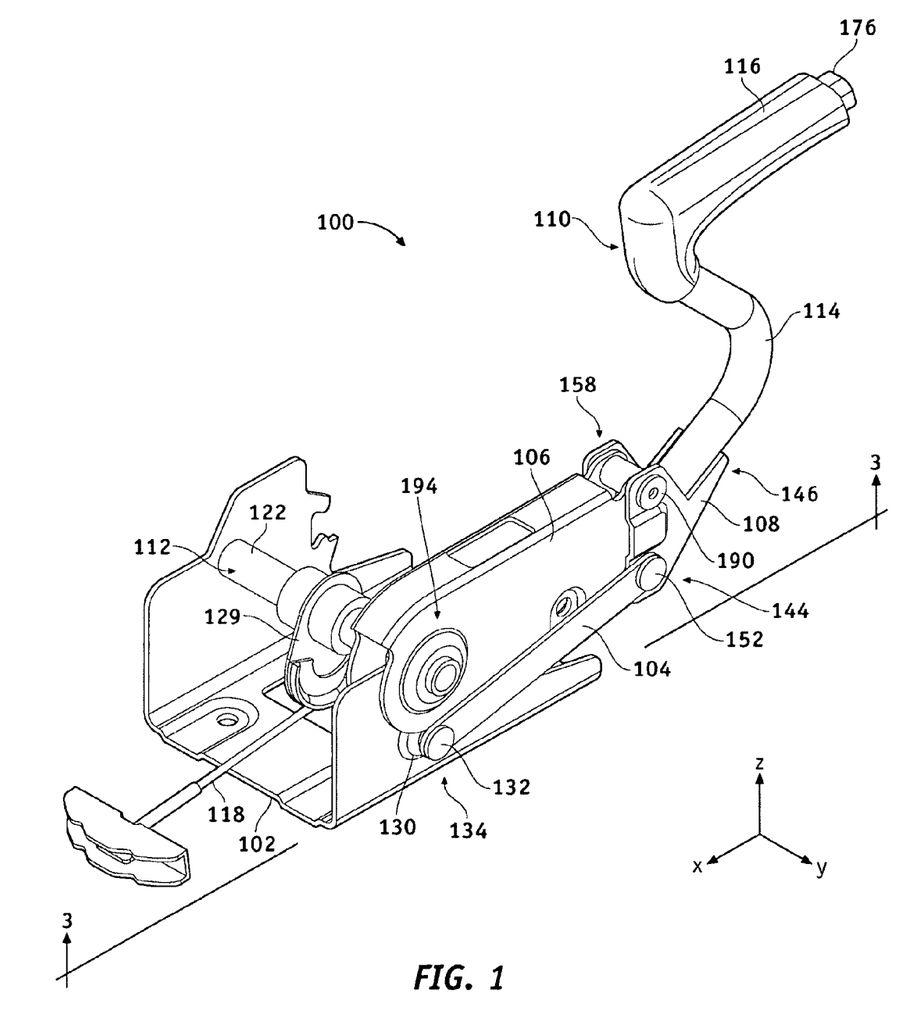
FIG. 1 is an angular perspective view of an exemplary multi-link brake actuation system suitable for use as a parking brake assembly in a vehicle in accordance with one embodiment.

Referring to FIG. 1 and FIG. 2, the brake cam 112 is disposed near the center or midpoint of a substantially cylindrical camshaft 122. The brake cam 112 is preferably realized using a rigid material, such as, for example, steel or aluminum. As best shown in FIG. 2, the brake cam 112 may include a notch 124 configured to mate with a finger 126 disposed on one end of the parking brake cable 118, as described below. In an exemplary embodiment, the camshaft 122 is realized using a rigid material, such as steel or aluminum, and the camshaft 122 is disposed such that its longitudinal ends 128 are supported by the mounting bracket 102. In this manner, the mounting bracket 102 prevents displacement of the brake cam 112 in a direction that is orthogonal relative to the collinear holes 120, 121 (e.g., in the x or z direction), but allows rotation of the brake cam 112 about the y axis, as described in greater detail below.

In an exemplary embodiment, the parking brake cable 118 is configured such that pulling or otherwise increasing the tension in the parking brake cable 118 engages the parking brake or emergency brake (not shown) for the vehicle in a conventional manner. As best shown in FIG. 2, the parking brake cable 118 includes a strand end fitting 126 disposed on one end of the parking brake cable 118. The strand end fitting 126 is configured to mate with the notch 124 of the brake cam 112. In this manner, the parking brake cable 118 is securely coupled to the brake cam 112, such that rotation of the brake cam 112 actuates the parking brake cable 118 by increasing and/or decreasing the tension or slack in the parking brake cable 118. In an exemplary embodiment, the notch 124 is disposed on the brake cam 112 such that rotation in a counterclockwise direction about the y-axis (as best shown relative to the side views shown in FIGS. 3-5) increases tension (or decreases slack) in the parking brake cable 118, and rotation of the brake cam 112 in a clockwise direction about the y-axis decreases tension (or increases slack) in the parking brake cable 118, as described in greater detail below. In this regard, the brake cam 112 may be equipped for self-adjustment of the parking brake cable 118 using a suitable self-adjustment mechanism 129, as will be appreciated in the art.

As best shown in FIG. 2, a boss 130 may be formed in or otherwise fixedly attached to a side of the mounting bracket 102. As shown, the boss 130 is preferably collinear with the hole 120, that is, the center of the boss 130 and the center of the hole 120 are aligned along the z-axis. The boss 130 is configured to allow the drive linkage 104 to be coupled or joined to the mounting bracket 102 at a first pivot 134 using a rivet 132. In various embodiments, the rivet 132 may be realized using a suitable coupling element, such as, for example, a pin, dowel, screw, and the like), as will be appreciated in the art.

Drive linkage 104 has a first end 136 and a second end 142, and the illustrated embodiment of drive linkage 104 is realized as a substantially straight bar, although other shapes may be utilized. In an exemplary embodiment, the drive linkage 104 is realized using a rigid material, such as, for example, steel, aluminum, or a suitable type of plastic. The drive linkage 104 is coupled to the mounting bracket 102 at a first pivot 134. For the illustrated embodiment, the boss 130 and rivet 132 are configured to securely fasten and/or fixedly attach the first end 136 of the drive linkage 104 to the mounting bracket 102. As shown in FIG. 2, the drive linkage 104 includes a hole 138 disposed near the first end 136 and configured to allow the rivet 132 to be coupled to and/or joined to the boss 130 via the hole 138. In this manner, the boss 130 and rivet 132 are configured such that displacement of the first end 136 is prevented while allowing the drive linkage 104 to rotate about the first pivot 134. In other words, the movement of the drive linkage 104 relative to the mounting bracket 102 is limited to rotation about the first pivot 134. In this regard, the drive linkage 104 may be understood as being pivotally attached to the mounting bracket 102. As shown, the drive linkage 104 includes a second hole 140 disposed near the second end 142 of the drive linkage 104. The second hole 140 is configured to allow the drive linkage 104 to be coupled to the secondary linkage 108 at a second pivot 144, as described in greater detail below.

Figure 3:
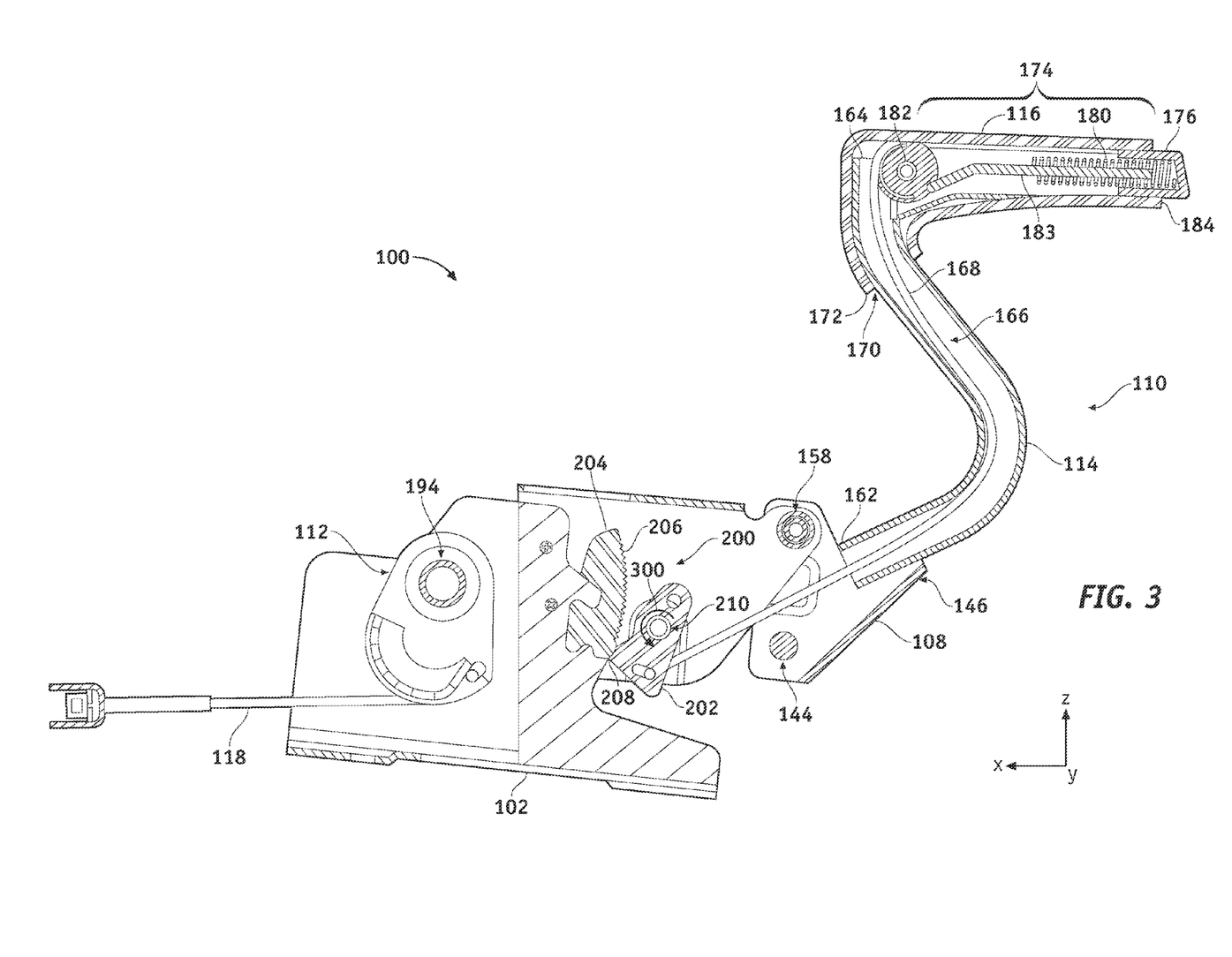
FIG. 3 is a cross-sectional view of the parking brake assembly of FIG. 1 along the line 3-3.

In an exemplary embodiment, the secondary linkage 108 is adapted to be coupled to and/or joined to the handle mechanism 110 and/or handle tube 114. In an exemplary embodiment, the secondary linkage 108 is realized using a rigid material, such as steel, aluminum, or another suitable metal. As best shown in FIG. 3, the secondary linkage 108 is formed with a support arm 146 adapted to receive an end 162 of the handle tube 114. The support arm 146 preferably configured to extend from the secondary linkage 108 substantially parallel to the end of the handle tube 114 and comprises a U-shaped cross-section which is configured such that the support arm 146 is flush with the handle tube 114 when the handle tube 114 is coupled to the secondary linkage 108. In this regard, the support arm 146 provides structural support to the handle tube 114 by preventing displacement of the end 162 of the handle tube 114, as will be appreciated in the art.

Depending on the embodiment, the secondary linkage 108 may be integral with the handle mechanism 110 and/or handle tube 114, as described in greater detail below. The secondary linkage 108 is coupled to the second end 142 of the drive linkage 104 at the second pivot 144. The secondary linkage 108 includes a hole 148 disposed near the bottom 150 of the secondary linkage 108. The hole 148 is configured to allow a coupling element 152 to be inserted through the hole 140 in the drive linkage 104 and through the hole 148 to create the second pivot 144. In this manner, the secondary linkage 108 is coupled to and/or pivotally attached to the drive linkage 104, in a similar manner to that described above. That is, the second pivot 144 prevents displacement of the bottom 150 of the secondary linkage 108 relative to the second end 142 of the drive linkage 104 while allowing the secondary linkage 108 to rotate about the second pivot 144 about the y-axis.

As shown in FIG. 2, the secondary linkage 108 includes a pair of holes 154 disposed near the top 156 of the secondary linkage 108. The holes 154 are configured to allow the secondary linkage 108 to be coupled to the primary linkage 106 at a third pivot 158, as described in greater detail below. In this regard, the placement of the holes 148, 154 and/or pivots 144, 158 and the separation distance define the orientation and length of the secondary linkage 108 for purposes of the four-bar linkage system, such that the secondary linkage 108 effectively functions as a straight bar (like drive linkage 104) for purposes of the parking brake assembly 100 even though the secondary linkage 108 is not a straight bar. In an exemplary embodiment, the secondary linkage 108 includes a void 160 such that the third pivot 158 may be realized as a double shear pivot joint, as described in greater detail below.

In an exemplary embodiment, a first end 162 the handle tube 114 is fixedly attached to the secondary linkage 108 and a second end 164 of the handle tube 114 is fixedly attached to the handle 116. The handle tube 114 is preferably realized using a rigid material, such as steel, aluminum, injected molded plastic, or another suitable material known in the art. As best shown in FIG. 3, the handle tube 114 is configured with a void 166 between the first end 162 and the second end 164, such that a release cable 168 may be coupled between the handle 116 and a locking arrangement 200, as described in greater detail below. The handle mechanism 110 is preferably configured such that the handle 116 remains substantially parallel to the reference plane in response to movement of the handle mechanism 110, as described in greater detail below. In addition, the handle tube 114 is also configured to minimize the impact that the travel path of the handle mechanism 110 has on the design of the interior passenger compartment of a vehicle. For the depicted embodiment, the handle tube 114 comprises a curved shape such that the handle mechanism 110 resembles an S-shaped member, wherein the handle 116 is substantially horizontal and biased toward the front of the vehicle. As described in greater detail below, in an exemplary embodiment, the curved shape of the handle tube 114 and/or handle mechanism 110 is designed to minimize the impact the travel path of the handle mechanism 110 has on the interior or center console of the vehicle. In other embodiments, the shape of the handle tube 114 may vary based upon the path that the secondary linkage 108 traverses when the handle mechanism 110 is actuated, as described in greater detail below.

Referring to FIG. 3, the handle 116 is configured with an opening 170 on one end 172 such that the second end 164 of the handle tube 114 may be inserted into the opening 170 and fixedly attached to the handle 116. The handle 116 is preferably realized using a material suitable for cosmetic and ergonomic purposes, such as leather, vinyl, plastic, or another suitable material known in the art. The handle 116 is shaped in a manner that comports with human design factors and can be comfortably actuated by a user. The handle 116 preferably includes a release mechanism 174 comprising a button 176, a spring 180, and a pulley 182. The button 176 is disposed on a second end 184 of the handle 116 and configured such that the button 176 may be depressed by the user. The spring 180 is coupled between the button 176 and the pulley 182, and the spring 180 is configured to actuate a rod 183, which in turn rotates the pulley 182 in response to actuation of the button 176. The pulley 182 is fixedly attached to an end of the release cable 168, such that the button 176 may increase tension in the release cable 168 and unlock a locking arrangement 200, as described in greater detail below. The spring 180 applies force to the button 176 to return the button 176 to a released position when it is not actuated, as will be appreciated in the art.

In an exemplary embodiment, the primary linkage 106 is realized with a rigid material, such as steel or aluminum.

Referring to FIGS. 1 and 2, the primary linkage 106 includes a pair of holes 186 disposed near a first end 188 of the primary linkage 106. The holes 186 are configured such that the primary linkage 106 may be coupled to the secondary linkage 108 at the third pivot 158. The end 188 of the primary linkage 106 may be inserted into the void 160 in the secondary linkage 108, and the holes 154, 186 are aligned such that the third pivot 158 may be realized as a double shear pivot joint by inserting a coupling element 190 such as, for example, a pin, dowel, screw, and the like), through the holes 154, 186. The double shear pivot joint prevents lateral movement and/or deflection in the parking brake assembly 100, as will be appreciated in the art.

Similarly, a second end 192 of the primary linkage 106 is coupled to the mounting bracket 102 at a fourth pivot 194. As best shown in FIG. 2, the primary linkage 106 includes a slot or void 196, such that the primary linkage 106 may engage the mounting bracket 102 by inserting a side of the mounting bracket 102 into the void 196. The primary linkage 106 includes a pair of holes 198 disposed near the end 192 of the primary linkage 106 and aligned with the hole 120 in the mounting bracket 102, that is, the centers of the holes 120, 198 are collinear (e.g., aligned along the y-axis). As described above in the context of secondary linkage 108, the placement of the holes 186, 198 and/or pivots 158, 194 and the separation distance define the orientation and length of the primary linkage 106 for purposes of the four-bar linkage system, such that the primary linkage 106 effectively functions as a straight bar, as will be appreciated in the art. The fourth pivot 194 may be realized as a double shear pivot joint by inserting the camshaft 122 through the holes 120, 198. The primary linkage 106 is fixedly attached to the camshaft 122 such that rotation of the primary linkage 106 about the fourth pivot 194 rotates and/or actuates the brake cam 112. In this manner, actuation forces applied to the handle mechanism 110 and/or handle 116 are transferred to the brake cam 112 via primary linkage 106, as described in greater detail below.

As best shown in FIGS. 2 and 3, in an exemplary embodiment, the locking arrangement 200 comprises a pawl 202 and sector 204. The sector 204 includes a toothed edge 206 configured to mate with one or more teeth 208 on the pawl 202. The sector 204 is fixedly attached to the mounting bracket 102 and the pawl 202 is coupled to the primary linkage 106 at a fifth pivot 210. The pivot 210 is positioned such that the teeth 208 of the pawl 202 engage the toothed edge 206 of the sector 204 as the primary linkage 106 rotates about the fourth pivot 194, and the teeth 206, 208 are configured to prevent rotation in the opposing direction, as described in greater detail below. An end 212 of the release cable 168 is fixedly attached to the pawl 202 opposite the teeth 208, and the release cable 168 is configured to cause the pawl 202 to disengage from the sector 204, as described in greater detail below.

In an exemplary embodiment, the parking brake assembly 100 is configured such that the four-bar linkage system is incapable of continuous motion. That is, the distances between the pivots 134, 144, 158, 194 (or the dimensions of the linkage elements 104, 106, 108) are chosen such that an initial position of the parking brake assembly 100 corresponds to the extent of the rotation and/or displacement of the four-bar linkage system in one direction, and a fully-actuated position of the parking brake assembly 100 corresponds to the extent of the rotation and/or displacement of the four-bar linkage system in the opposite direction. For example, as shown in FIG. 4, the parking brake assembly 100 is configured such that it cannot be rotated and/or displaced clockwise about the y-axis beyond its initial position. Likewise, as shown in FIG. 5, the parking brake assembly 100 cannot be rotated and/or displaced counterclockwise about the y-axis beyond a fully-actuated position.

In an exemplary embodiment, the distances between the pivots 134, 144, 158, 194 (or the dimensions of the linkage elements 104, 106, 108) are chosen such that handle 116 remains substantially parallel to the xy reference plane. In accordance with one embodiment, the ratio of the length of the primary linkage 106 to the length of the drive linkage 104 is one to one (e.g., the linkages 104, 106 are equal in length). The ratio of the distance between fourth pivot 194 and first pivot 134 and the length of the primary linkage 106 is one to 3.4. The ratio of the distance between fourth pivot 194 and first pivot 134 to the distance between second pivot 144 and third pivot 158 is one to 1.2. By tuning the four-bar linkage system, the position of the handle mechanism 110 is configured such that the handle 116 remains substantially parallel. It should be understood that the ratios and/or relationships described above are presented for purposes of explanation, and the subject matter is not intended to be limited to particular dimensions or relationships between the linkage elements.

As shown in FIG. 4, the parking brake assembly 100 is preferably configured such that the handle 116 is initially aligned with and/or parallel to a reference plane in an initial position. The handle mechanism 110 and/or handle tube 114 is configured such that the handle 116 is initially oriented parallel to the xy-plane when the parking brake assembly 100 is in its initial position. In other words, the parking brake assembly 100 may be configured within the vehicle passenger compartment such that the handle 116 is substantially horizontal (e.g., substantially parallel to the vehicle chassis 103) relative to a user, such as a driver or passenger. In this initial position, the vehicle parking brake is not engaged and there is minimal tension in the parking brake cable 118, as will be appreciated in the art.

Referring now to FIG. 5, a generally upward and backward force applied to the handle 116 and/or handle mechanism 110 causes the parking brake assembly 100 to travel from the initial position to its fully-actuated position. Force applied to the handle 116 causes the primary linkage 106 to rotate about the fourth pivot 194 in the direction indicated by arrow 400 (e.g., counterclockwise about the y-axis). In response, the secondary linkage 108 rotates about the third pivot 158 in the direction indicated by arrow 402 (e.g., clockwise about the y-axis) and about the second pivot 144 in the direction indicated by arrow 404 (e.g., clockwise about the y-axis), and the drive linkage 104 rotates about the first pivot 134 in the direction indicated by arrow 406 (e.g., counterclockwise about the y-axis).

As the primary linkage 106 to rotates about the fourth pivot 194 in the direction of arrow 400, the primary linkage 106 causes the camshaft 122 to rotate in the same direction, which in turn, rotates the brake cam 112 and pulls or otherwise increases tension in the parking brake cable 118 which actuates and/or engages the parking brake (or emergency brake) in a conventional manner. In addition, as the primary linkage 106 rotates about the fourth pivot 194 in the direction of arrow 400, the teeth 208 of the pawl 202 engage the toothed edge 206 of the sector 204 which prevents rotation of the primary linkage 106 in the opposite direction. In this regard, the toothed edge 206 of the sector 204 may be angled upward (e.g., the teeth extend from the body of the sector 204 generally in the positive z-direction) to prevent downward rotation (e.g., in the direction opposite arrow 400) of the primary linkage 106. In this manner, the pawl 202 and sector 204 counterbalance the opposing force on the primary linkage 106 (e.g., via camshaft 122) caused by increased tension in the parking brake cable 118 to hold or lock the primary linkage 106 and/or parking brake assembly 100 in a locked or actuated position. To return the parking brake assembly 100 to the initial position, the release mechanism 174 may be activated by pressing the button 176 to apply compressive force to the spring 180, which in turn causes the pulley 182 to rotate and increase tension in the release cable 168. As best shown in FIGS. 2 and 3, increased tension in the release cable 168 causes the pawl 202 to rotate about the fifth pivot 210 in the direction indicated by arrow 300 (e.g., counterclockwise about the y-axis) such that the teeth 208 of the pawl 202 are disengaged from the sector 204. In this regard, the handle tube 114 is configured to accommodate changes in tension and/or slack in the release cable 168. When the pawl 202 is disengaged, the primary linkage 106 may be rotated in the direction opposite arrow 400 (e.g., clockwise about the y-axis), which in turn rotates the camshaft 122 and/or brake cam 112. In this manner, the decreased tension in the parking brake cable 118 disengages the parking brake and the parking brake assembly 100 may be returned to its initial position, as will be appreciated in the art.

Referring again to FIGS. 4 and 5, the parking brake assembly 100 and/or handle mechanism 110 is configured such that the handle 116 remains substantially parallel to or aligned with the reference plane as the parking brake assembly 100 is actuated. For example, as shown, the curved shape of the handle tube 114 allows the handle 116 to remain substantially parallel to the xy-plane as the handle mechanism 110 moves. Depending on the embodiment, the distance between the pivots 134, 144, 158, 194 (or the dimensions of the linkage elements 104, 106, 108) may vary based on packaging constraints, which in turn affects the path the secondary linkage 108 traverses. As a result, the shape of the handle tube 114 may be modified based on the path of the secondary linkage 108 such that the handle 116 remains substantially parallel to a reference plane when the parking brake assembly 100 is actuated.

In this manner, the parking brake assembly 100 may be utilized to actuate the vehicle parking brake in a manner that comports with human design factors. For example, the parking brake assembly 100 may be disposed in a center console in the vehicle passenger compartment. A user situated proximate the parking brake assembly 100 may apply a force to the handle mechanism 110 and/or handle 116 in a vertical or upward direction to actuate the parking brake assembly 100. Because the handle 116 remains substantially parallel and/or aligned to the initial reference plane, force may be applied to the handle 116 in a substantially constant direction (e.g., in the z-direction) and user maintains constant leverage as the parking brake assembly 100 is actuated. Additionally, the direction of the force (e.g., vertical) comports with the direction in which comports with human factors for the preferred and/or easiest direction for applying force.

Furthermore, in an exemplary embodiment, the handle mechanism 110 and/or handle tube 114 is configured to minimize the impact that the travel path of the handle mechanism 110 has on the design of the interior passenger compartment of a vehicle. In effect, the handle 116 operates as a lever that rotates about a dynamic pivot point that varies as the parking brake assembly 100 is actuated. As shown in FIGS. 4 and 5, the travel path of the handle mechanism 110 and/or handle tube 114 from the initial position to the fully-actuated position is less arcuate than that of a conventional lever, or in other words, the effective pivot radius is much larger than the pivot radius of the conventional lever. As a result, the travel path of the handle mechanism 110 and/or handle tube 114 can be more easily accommodated and the impact of the parking brake assembly 100 on the design of the interior passenger compartment is reduced.

To briefly summarize, the systems and/or methods described above provide a parking brake assembly that allows the travel path for the parking brake lever to be tuned or optimized based on interior packaging constraints for a vehicle. For example, the parking brake assembly may be integrated into a center console that allows for improved cup holders, armrests, shifters, and additional aesthetic improvements and/or design flexibility relative to center consoles that incorporate conventional parking brake levers. Additionally, the handle may be oriented and/or aligned in a manner that comports with human factors and maximizes the leverage of a user throughout the travel path of the parking brake lever.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. A parking brake assembly for a vehicle, the parking brake assembly comprising:
   a mounting bracket fixedly attached to a mounting location of the vehicle;
   a first linkage element having a first end and a second end, the first end of the first linkage element being coupled to the mounting bracket at a first pivot;
   a second linkage element having a first end and a second end, the first end of the second linkage element being pivotally attached to the mounting bracket;
   a brake cam coupled to the first linkage element at the first pivot; and
   a handle mechanism pivotally attached to the second end of the first linkage element and to the second end of the second linkage element, the handle mechanism being configured such that movement of the handle mechanism actuates the brake cam.

2. The parking brake assembly of claim 1, wherein the handle mechanism comprises:
   a third linkage element having a first end and a second end, the first end of the third linkage element being pivotally attached to the second end of the first linkage element and the second end of the third linkage element being pivotally attached to the second end of the second linkage element; and
   a handle coupled to the third linkage element, wherein a force applied to the handle results in movement of the handle mechanism.

3. The parking brake assembly of claim 2, further comprising a handle tube coupled between the handle and the third linkage element.

4. The parking brake assembly of claim 3, the handle tube being fixedly attached to the third linkage element, wherein the handle tube is configured such that the handle is initially aligned parallel to a reference plane and the handle remains substantially parallel to the reference plane in response to movement of the handle mechanism.

5. The parking brake assembly of claim 3, further comprising a pawl coupled to the first linkage element, wherein the pawl is configured to lock the first linkage element in a locked position such that it prevents movement of the handle mechanism.

6. The parking brake assembly of claim 5, further comprising a first cable coupled to the pawl and the handle, wherein the handle includes a release mechanism configured to actuate the first cable such that the first linkage element is released from the locked position.

7. The parking brake assembly of claim 6, the first cable being coupled to the handle via the handle tube, wherein the handle tube is configured to allow the first cable to release the pawl in response to actuating the release mechanism.

8. The parking brake assembly of claim 1, further comprising a parking brake cable coupled to the brake cam, wherein the parking brake cable engages a vehicle brake in response to actuating the brake cam.

9. A multi-link brake actuation system comprising:
a first link having a substantially fixed position relative to a reference location;
a second link having a first end and a second end, the first end being pivotally attached to the first link;
a third link pivotally attached to the second end of the second link;
a fourth link having a first end and a second end, the first end of the fourth link being pivotally attached to the third link, and the second end of the fourth link being pivotally attached to the first link; and
a parking brake cable coupled to the second end of the fourth link, wherein movement of the third link actuates the parking brake cable.

10. The multi-link brake actuation system of claim 9, wherein the first link comprises a mounting bracket fixedly attached to a mounting location of a vehicle.

11. The multi-link brake actuation system of claim 9, the second end of the fourth link being pivotally attached to the first link at a first pivot, wherein the multi-link brake actuation system further comprises a brake cam coupled to the first pivot and attached to the parking brake cable such that movement of the third link actuates the parking brake cable.

12. The multi-link brake actuation system of claim 9, further comprising a handle mechanism attached to the third link.

13. The multi-link brake actuation system of claim 12, wherein the handle mechanism comprises:
a handle tube attached to the third link; and
a handle coupled to the handle tube, wherein a force applied to the handle results in movement of the third link.

14. The multi-link brake actuation system of claim 13, wherein the handle tube is configured such that the handle is initially aligned parallel to a reference plane and the handle remains substantially parallel to the reference plane in response to movement of the handle mechanism.

15. The multi-link brake actuation system of claim 12, further comprising a pawl coupled to the fourth link, the pawl being configured to lock the fourth link in a locked position.

16. The multi-link brake actuation system of claim 15, further comprising a first cable coupled to the pawl and the handle mechanism, wherein the handle mechanism is configured to actuate the first cable and release the fourth link from the locked position.

17. A multi-link actuation system for a parking brake in a vehicle, the multi-link actuation system comprising:
a brake cam;
a four-bar linkage system having a first link and a second link, the first link having a first end and a second end, the first end being attached to the brake cam and the second end being coupled to the second link; and
a handle coupled to the second link, the handle being initially aligned parallel to a reference plane, wherein the four-bar linkage system and the handle are cooperatively configured to actuate the parking brake cam in response to movement of the handle, wherein the handle remains substantially parallel to the reference plane in response to movement of the handle.

18. The multi-link actuation system of claim 17, further comprising a handle tube coupled between the handle and the second link, the handle tube being fixedly attached to the second link, wherein the handle tube is configured such that the handle remains substantially parallel to the reference plane.

19. The multi-link actuation system of claim 18, further comprising a locking arrangement coupled to the four-bar linkage system, wherein the locking arrangement is configured to lock the first link in a locked position.

20. The multi-link actuation system of claim 19, further comprising a first cable coupled to the locking arrangement and the handle via the handle tube, wherein the handle includes a release mechanism configured to actuate the first cable such that first link is released from the locked position.

* * * * *